United States Patent
Lee et al.

(10) Patent No.: US 11,110,555 B2
(45) Date of Patent: Sep. 7, 2021

(54) PRESSING STRUCTURE

(71) Applicant: Cheng Uei Precision Industry Co., Ltd., New Taipei (TW)

(72) Inventors: Tsung Shih Lee, New Taipei (TW); Chi Ming Tseng, New Taipei (TW); Chia Fa Cheng, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 182 days.

(21) Appl. No.: 16/686,375

(22) Filed: Nov. 18, 2019

(65) Prior Publication Data

US 2021/0046592 A1 Feb. 18, 2021

(30) Foreign Application Priority Data

Aug. 15, 2019 (CN) .......................... 201921322241.2

(51) Int. Cl.
| | |
|---|---|
| *B23P 19/02* | (2006.01) |
| *H01H 11/00* | (2006.01) |
| *H01H 1/58* | (2006.01) |
| *H01H 25/04* | (2006.01) |
| *B30B 15/06* | (2006.01) |

(52) U.S. Cl.
CPC .............. *B23P 19/02* (2013.01); *H01H 11/00* (2013.01)

(58) Field of Classification Search
CPC ....... B23P 19/02; H01H 11/00; H01H 1/5805; H01H 1/50; H01H 25/04; B30B 15/068
See application file for complete search history.

(56) References Cited

U.S. PATENT DOCUMENTS

| | | | | |
|---|---|---|---|---|
| 3,949,588 | A * | 4/1976 | Seo .................... | B21D 3/10 72/389.6 |
| 7,884,291 | B2 * | 2/2011 | Terao ................ | H01H 25/04 200/6 A |
| 8,407,887 | B2 * | 4/2013 | Lee .................. | H01L 21/67092 29/761 |
| 8,973,807 | B2 * | 3/2015 | Fujita ................ | B29C 65/081 228/110.1 |
| 10,499,551 | B2 * | 12/2019 | Ota .................... | H05K 13/0465 |
| 10,825,623 | B1 * | 11/2020 | Tseng ................ | H01H 23/14 |
| 2011/0088255 | A1 * | 4/2011 | Lee .................. | H01L 21/67092 29/761 |
| 2012/0115339 | A1 * | 5/2012 | Schaarschmidt .... | H01R 43/205 439/66 |

(Continued)

*Primary Examiner* — Bayan Salone
(74) *Attorney, Agent, or Firm* — Lin & Associates IP, Inc.

(57) ABSTRACT

A pressing structure includes a support frame and a pressing element. The pressing element is mounted to a bottom surface of the base plate. The pressing element includes a pedestal and a cushion element. The pedestal has a base board. A bottom surface of the base board protrudes downward to form a pressing block. A bottom surface of the pressing block is recessed upward and gradually arched outward from top to bottom to form a first pressing face. The rocker component has a base portion. The first pressing face is in contact with the base portion. The cushion element is mounted on the pedestal, so that the rocker component is mounted on the electronic component by the pressing structure, the rocker component and the electronic component are without affording the excessive pressure force to cause a damage and a deformation of the electronic component.

16 Claims, 8 Drawing Sheets

(56) References Cited

U.S. PATENT DOCUMENTS

| | | | |
|---|---|---|---|
| 2013/0026211 A1* | 1/2013 | Fujita | B29C 65/08 |
| | | | 228/110.1 |
| 2016/0093564 A1* | 3/2016 | Miyazawa | B23K 37/0408 |
| | | | 257/779 |
| 2017/0273227 A1* | 9/2017 | Ota | H05K 13/0495 |

* cited by examiner

PRESSING STRUCTURE

CROSS-REFERENCE TO RELATED APPLICATION

The present application is based on, and claims priority form, China Patent Application No. 201921322241.2, filed Aug. 15, 2019, the disclosure of which is hereby incorporated by reference herein in its entirety.

BACKGROUND OF THE INVENTION

1. Field of the Invention

The present invention generally relates to a pressing structure, and more particularly to a pressing structure capable of absorbing an excessive pressure force which is caused by the pressing structure exerted on a processed component during a pressure operation.

2. The Related Art

In a process of assembling products, in order to avoid accumulated tolerances in assembly, a pressing machine is often used to eliminate accumulated tolerances of a pressing assembly. Whereas a conventional pressing structure proceeds with a manufactured pressure operation in the pressing machine, pneumatic cylinders are used to push the pressing structure downwards for proceeding with the manufactured pressure operation.

However, with the development of science and technology, sizes of electronic components develop towards a more and more elaborate trend. At the time of proceeding with the manufactured pressure operation, the pressing structure proceeds with a downward pressure, the downward pressure frequently exceeds a strength capable of being loaded by the more elaborated electronic components, so that each electronic component easily suffers an excessive pressure to cause a deformation or a damage.

Thus, it is essential to provide an innovative pressing structure, the innovative pressing structure is capable of absorbing an excessive pressure force which is caused by the pressing structure and is exerted on a processed component during a pressure operation, so that the processed component can be safely pressed and processed.

SUMMARY OF THE INVENTION

An object of the present invention is to provide a pressing structure adapted for mounting a rocker component on an electronic component. The pressing structure includes a support frame and a pressing element. The pressing element is mounted to a bottom surface of the base plate. The pressing element includes a pedestal and a cushion element. The pedestal has a base board. A bottom surface of the base board protrudes downward to form a pressing block. A bottom surface of the pressing block is recessed upward and gradually arched outward from top to bottom to form a first pressing face facing downward. The rocker component has a base portion. The first pressing face is in contact with the base portion. The cushion element is mounted on the pedestal for absorbing an excessive pressure force generated on the pressing element at the time of the pressing element being pressed downward, so that the rocker component is mounted on the electronic component by the pressing structure, the rocker component and the electronic component are without affording the excessive pressure force to cause a damage and a deformation of the electronic component.

Another object of the present invention is to provide a pressing structure adapted for mounting a rocker component on an electronic component. The pressing structure includes a support frame and a pressing element. The pressing element is mounted under the support frame. The pressing element includes a pedestal and a cushion element. The pedestal has a base board. A bottom surface of the base board protrudes downward to form a pressing block. A bottom surface of the pressing block is recessed upward and gradually arched outward from top to bottom to form a first pressing face facing downward. The cushion element is mounted between a bottom of the support frame and the pressing element for absorbing an excessive pressure force generated on the pressing element at the time of the pressing element being pressed downward, so that the rocker component is mounted on the electronic component by the pressing structure, the rocker component and the electronic component being without affording the excessive pressure force. The rocker component has a base portion. The first pressing face is in contact with the base portion of the rocker component.

Another object of the present invention is to provide a pressing structure adapted for mounting a rocker component on an electronic component. The pressing structure includes a support frame and a pressing element. The pressing element is mounted under the support frame. The pressing element includes a pedestal and a plurality of cushion elements. The pedestal has a base board. A bottom surface of the base board protrudes downward to form a pressing block. A bottom surface of the pressing block is recessed upward and gradually arched outward from top to bottom to form a first pressing face facing downward. Each cushion element is mounted on the first pressing face for absorbing an excessive pressure force generated on the pressing element at the time of the pressing element being pressed downward, so that the rocker component is mounted on the electronic component by the pressing structure, the rocker component and the electronic component are without affording the excessive pressure force. Each cushion element contacts the rocker component.

As described above, each cushion elements is mounted on the pedestal of the pressing structure, when the pressing structure proceeds with a pressing operation, each cushion element absorbs a pressing force generated from the pressing structure to reduce the excessive pressure force exerted on the rocker component by the pressing element, so that the rocker component is mounted on the electronic component by the pressing structure, and the pressing element is without exerting the excessive pressure force on the rocker component to make the rocker component overly press downward on the electronic component for preventing the deformation and the damage of the electronic component.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
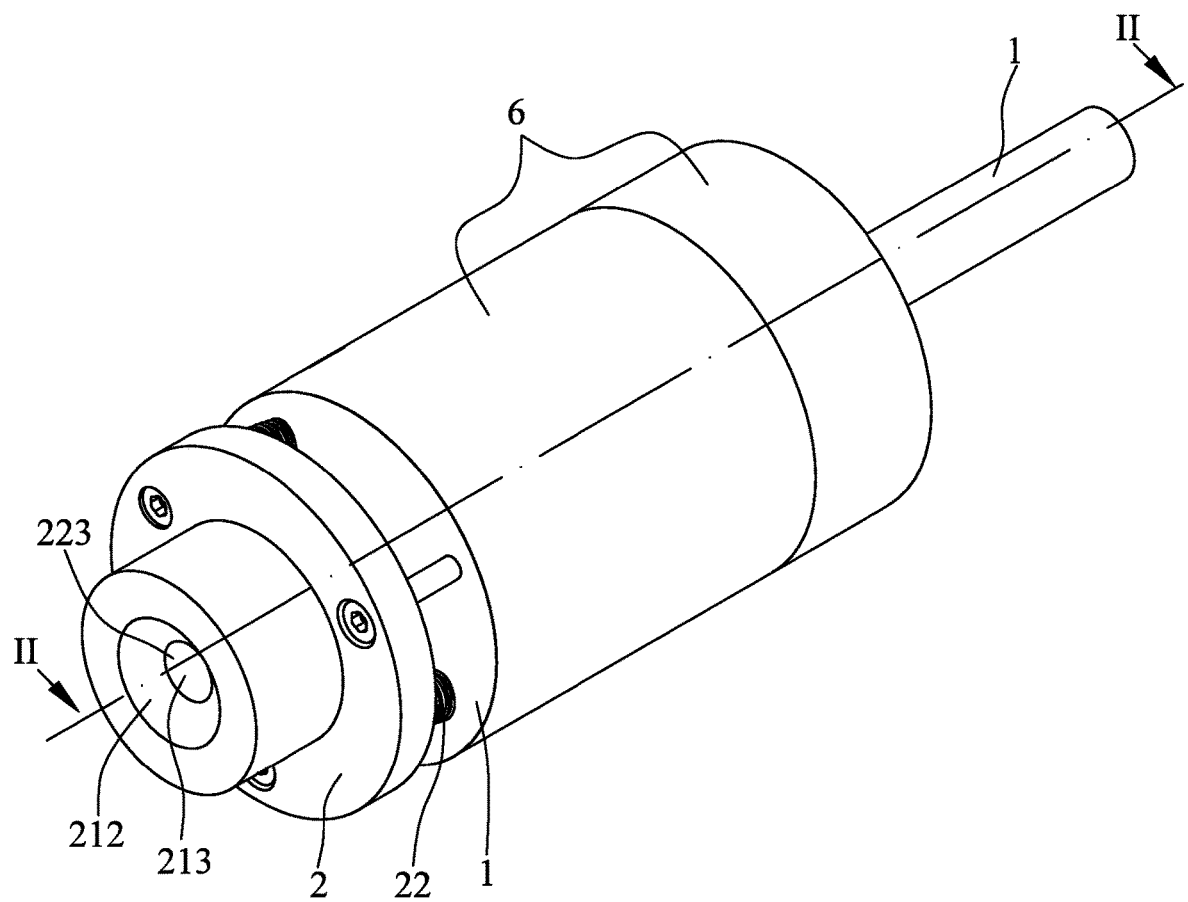
FIG. 1 is a perspective view of a pressing structure in accordance with a first preferred embodiment of the present invention.
Figure 2:
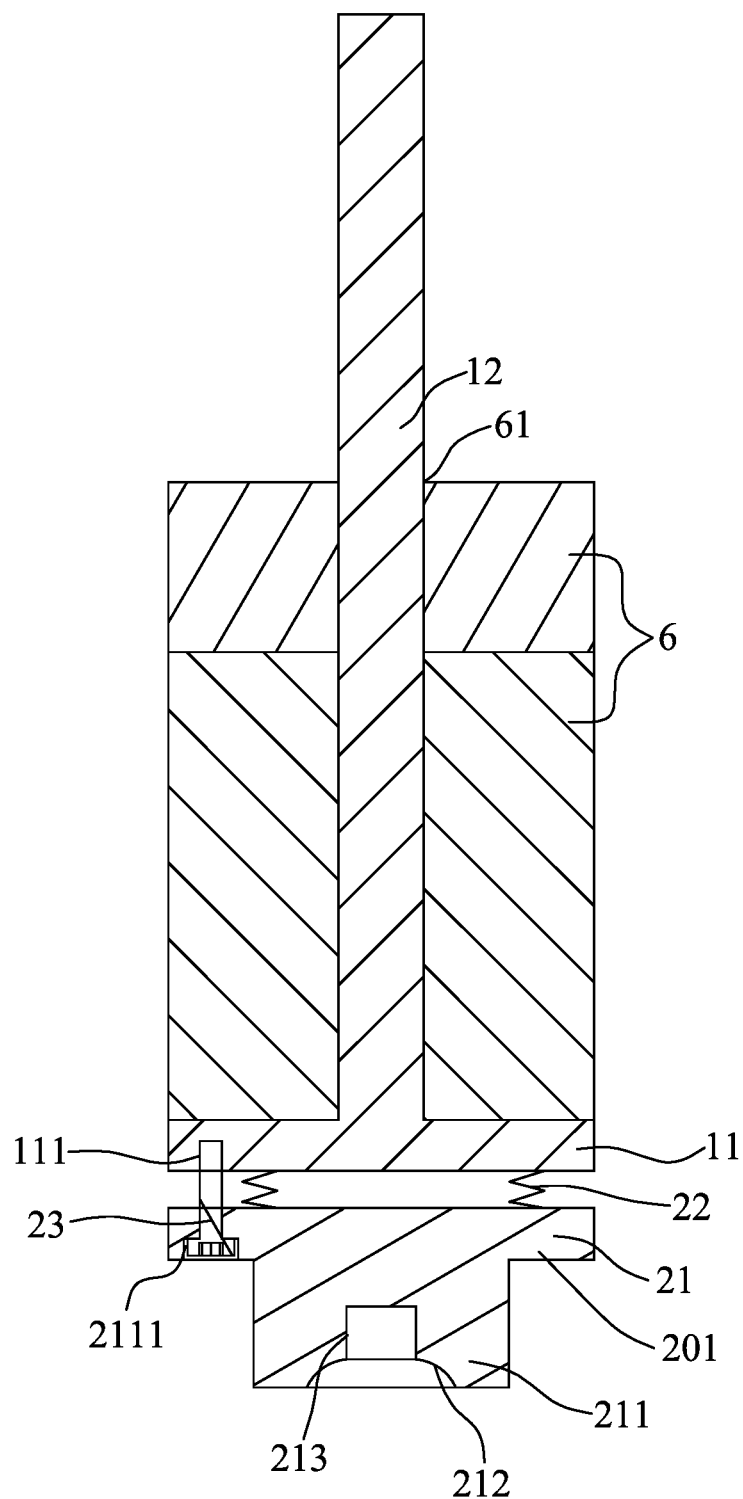
FIG. 2 is a cross-section view of the pressing structure along a line II-II of FIG. 1.
Figure 3:
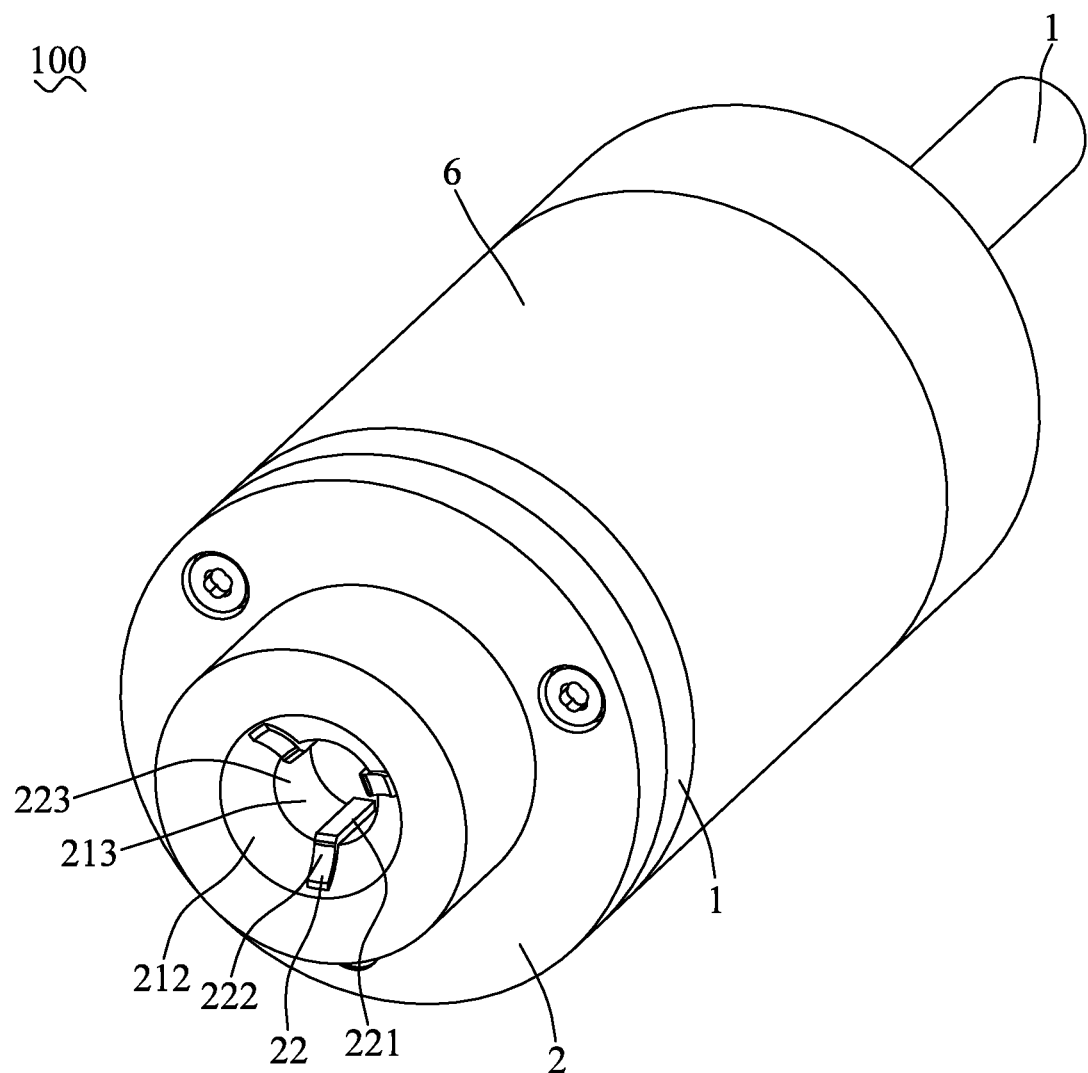
FIG. 3 is a perspective view of a pressing structure in accordance with a second preferred embodiment of the present invention.
Figure 4:
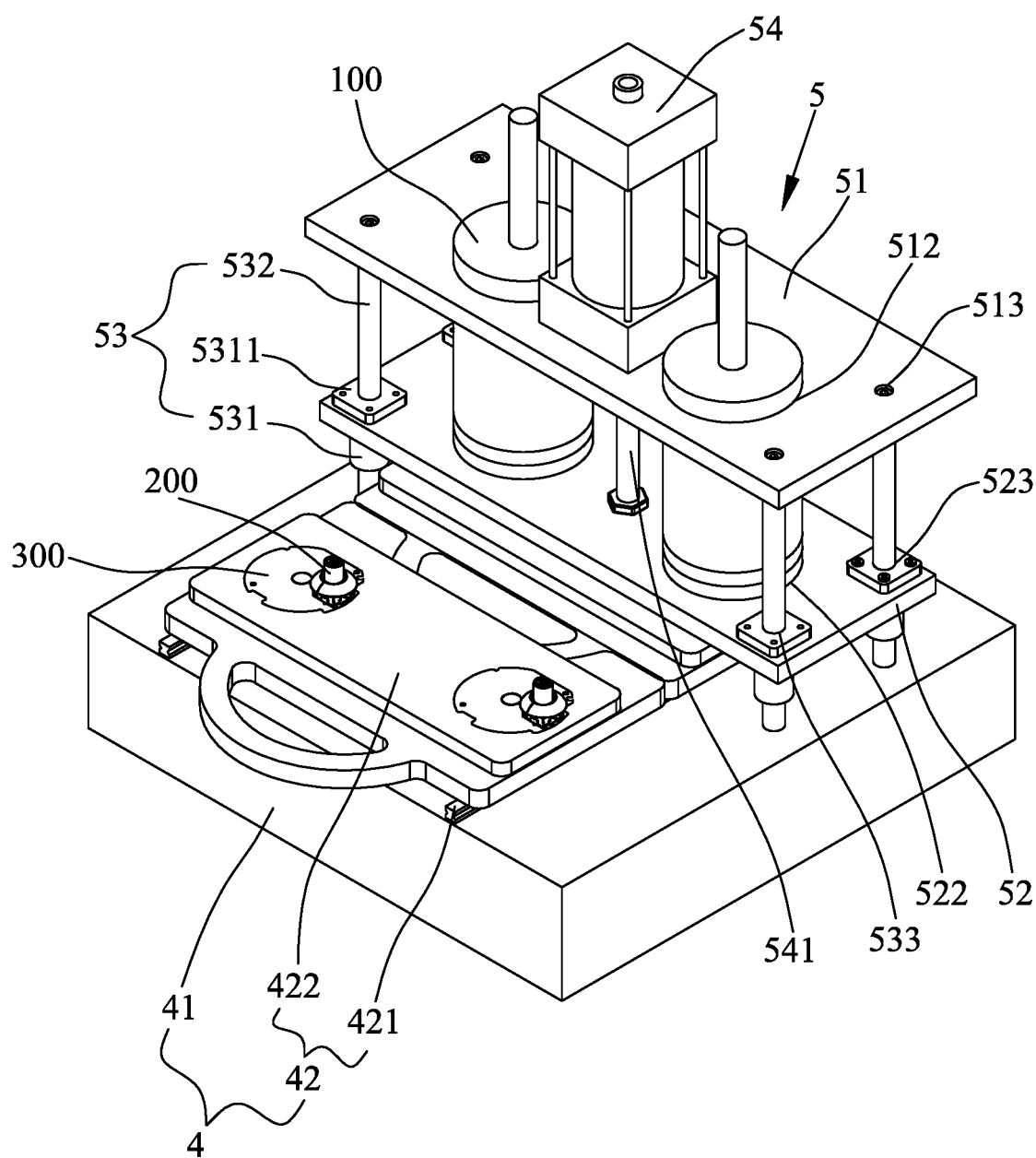
FIG. 4 is a perspective view showing that the pressing structure of a pressing machine manufactures an electronic component.
Figure 5:
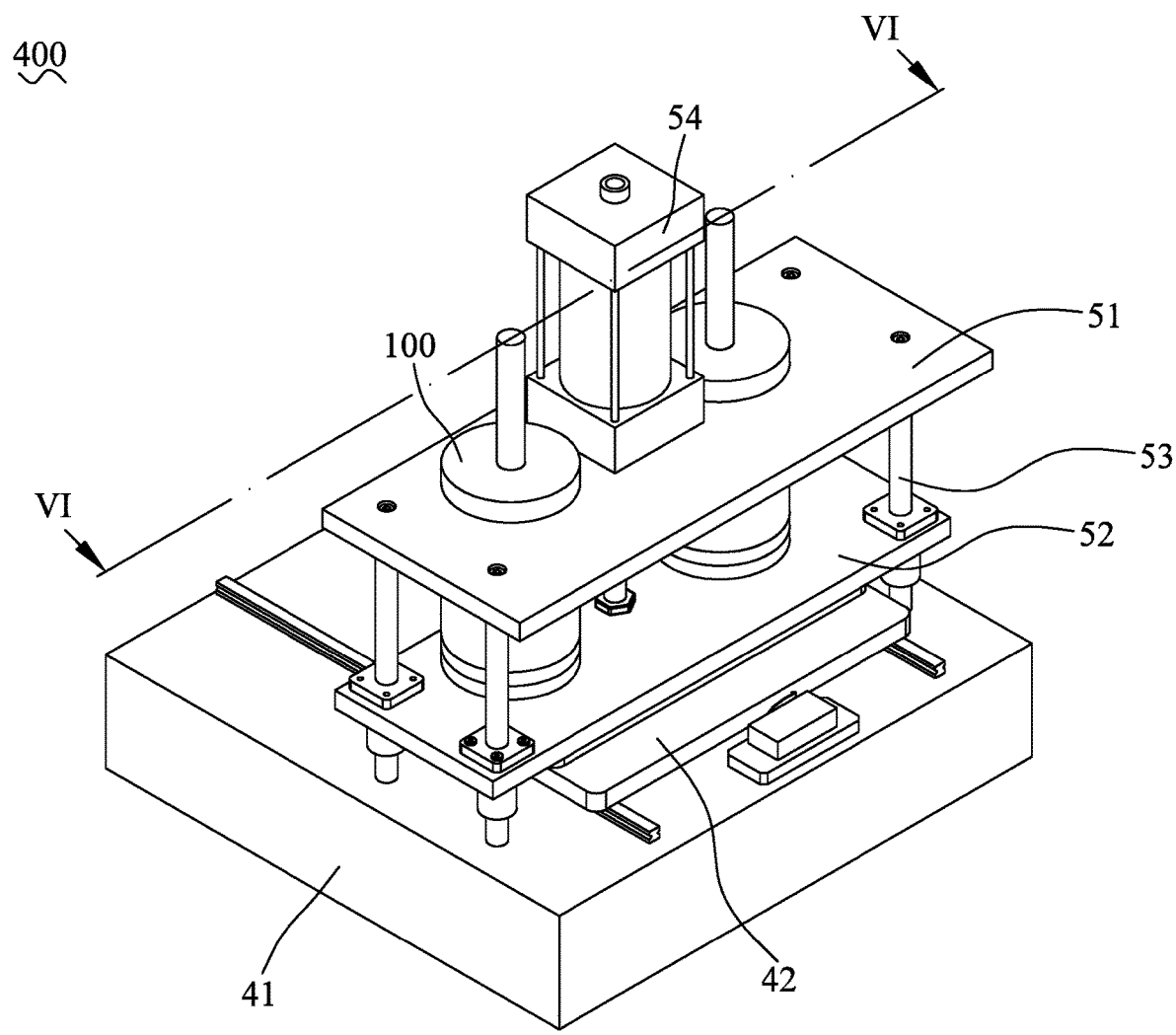
FIG. 5 is a perspective view showing that the pressing structure of the pressing machine manufactures the electronic component.
Figure 6:
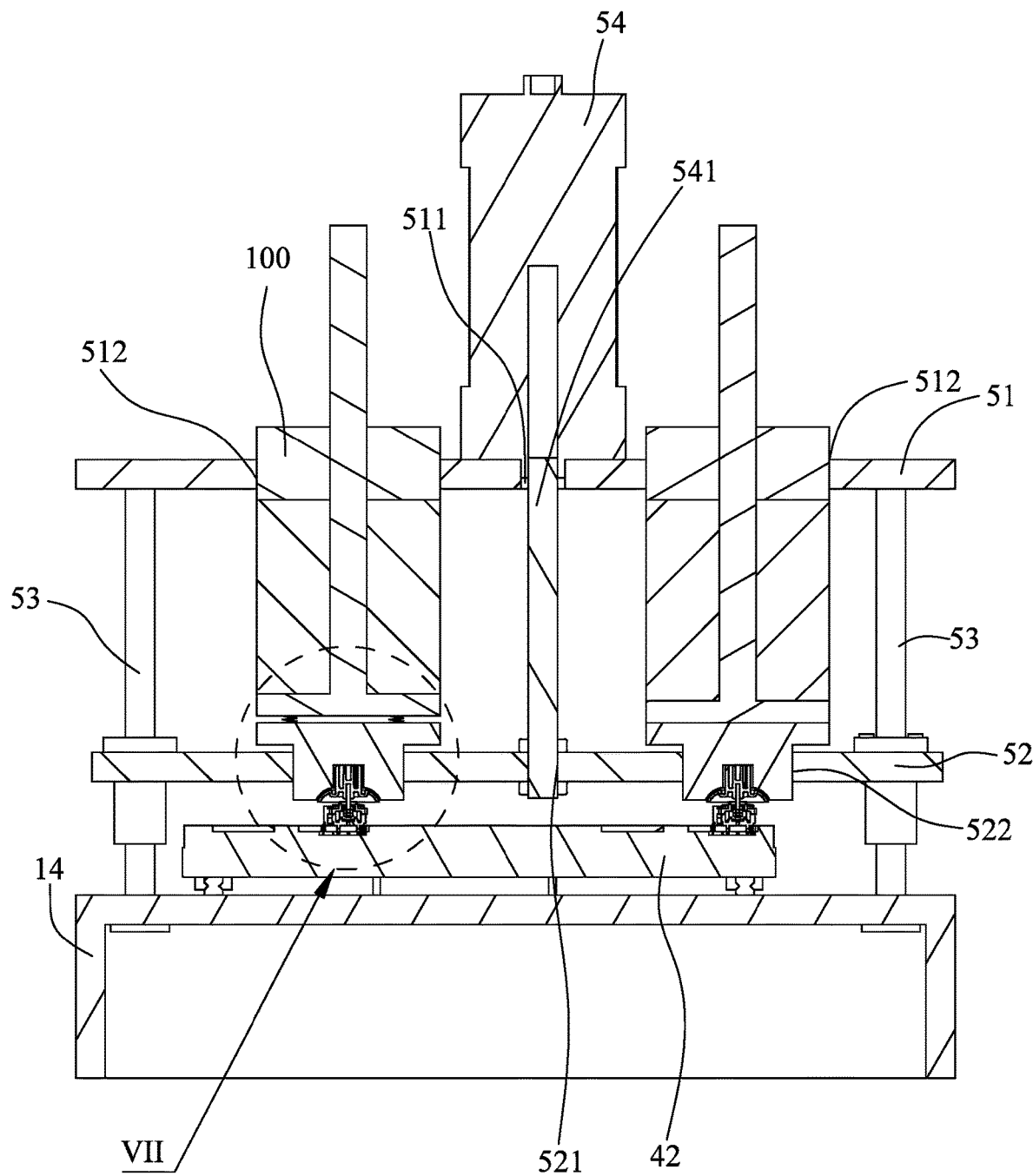
FIG. 6 is a cross-section view of the pressing structure along a line VI-VI of FIG. 5.

With reference to FIG. 1, FIG. 2 and FIG. 4, a pressing structure 100 in accordance with a first preferred embodiment of the present invention is shown. The pressing structure 100 is adapted for mounting a rocker component 200 on an electronic component 300. The pressing structure 100 includes a support frame 1 and a pressing element 2.

The support frame 1 has a base plate 11, and a pole stander 12 protruded upward from a middle of a top surface of the base plate 11. Several portions of a bottom surface of the base plate 11 are recessed inward to form a plurality of first fixing holes 111.

The pressing element 2 is mounted under the support frame 1. The pressing element 2 is mounted to the bottom surface of the base plate 11. The pressing element 2 includes a pedestal 21 and a cushion element 22. Preferably, the pressing element 2 includes a plurality of cushion elements 22. The pedestal 21 has a rectangular base board 201. A middle of a bottom surface of the base board 201 of the pedestal 21 protrudes downward to form a pressing block 211. A periphery of the pedestal 21 opens a plurality of second fixing holes 2111 vertically penetrating through the periphery of the pedestal 21, and the plurality of the second fixing holes 2111 are corresponding to the plurality of the first fixing holes 111, respectively. The pressing structure 100 further includes a plurality of fixing elements 23. The plurality of the fixing elements 23 pass through the plurality of the second fixing holes 2111 and the plurality of the first fixing holes 111, respectively, so that the support frame 1 and the pressing element 2 are fastened with each other. A middle of a bottom surface of the pressing block 211 is recessed upward and gradually arched outward from top to bottom to form a first pressing face 212 facing downward. A middle of a top of the first pressing face 212 is further recessed upward to form a second pressing face 213. The middle of the top of the first pressing face 212 forms a receiving hole 223 communicated between the first pressing face 212 and the second pressing face 213.

The cushion element 22 is mounted on the pedestal 21. Each cushion element 22 is mounted on the pedestal 21 for absorbing the excessive pressure force generated on the pressing element 2 at the time of the pressing element 2 being pressed downward, so that the rocker component 200 is mounted on the electronic component 300 by the pressing structure 100, the rocker component 200 and the electronic component 300 are without affording the excessive pressure force to cause a damage and a deformation of the electronic component 300.

Figure 7:
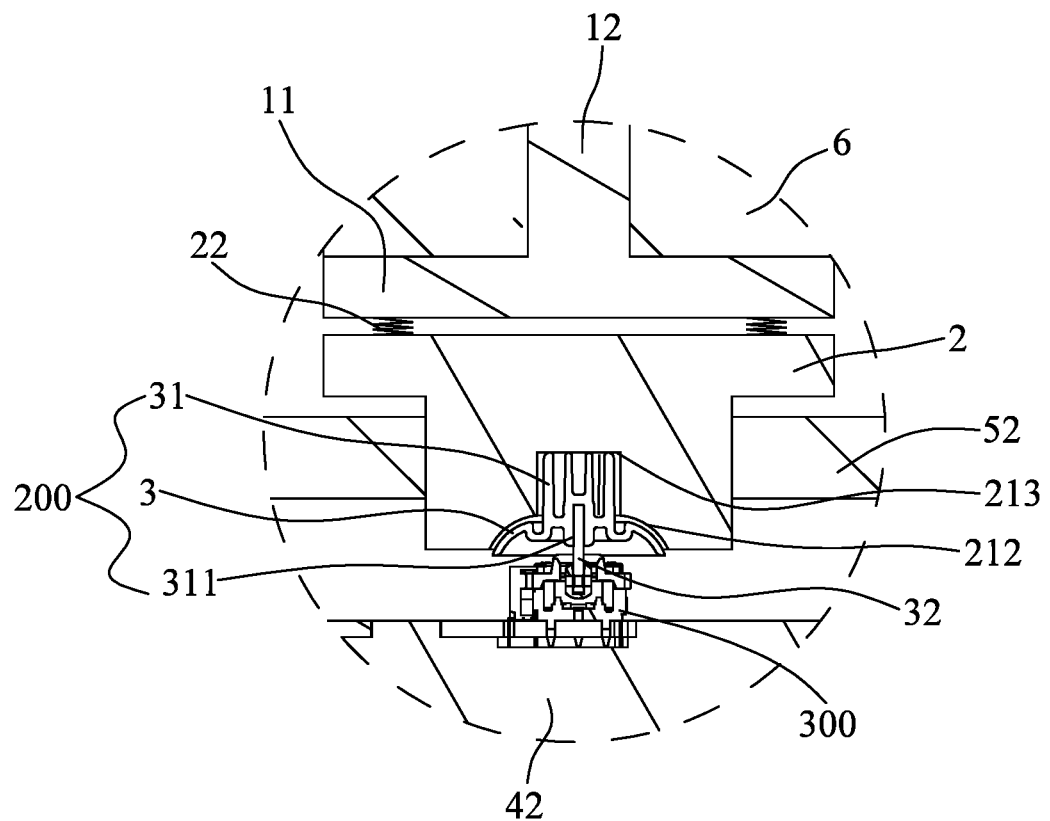
FIG. 7 is an enlarged view of an encircled portion VII of the pressing structure of FIG. 6.
Figure 8:
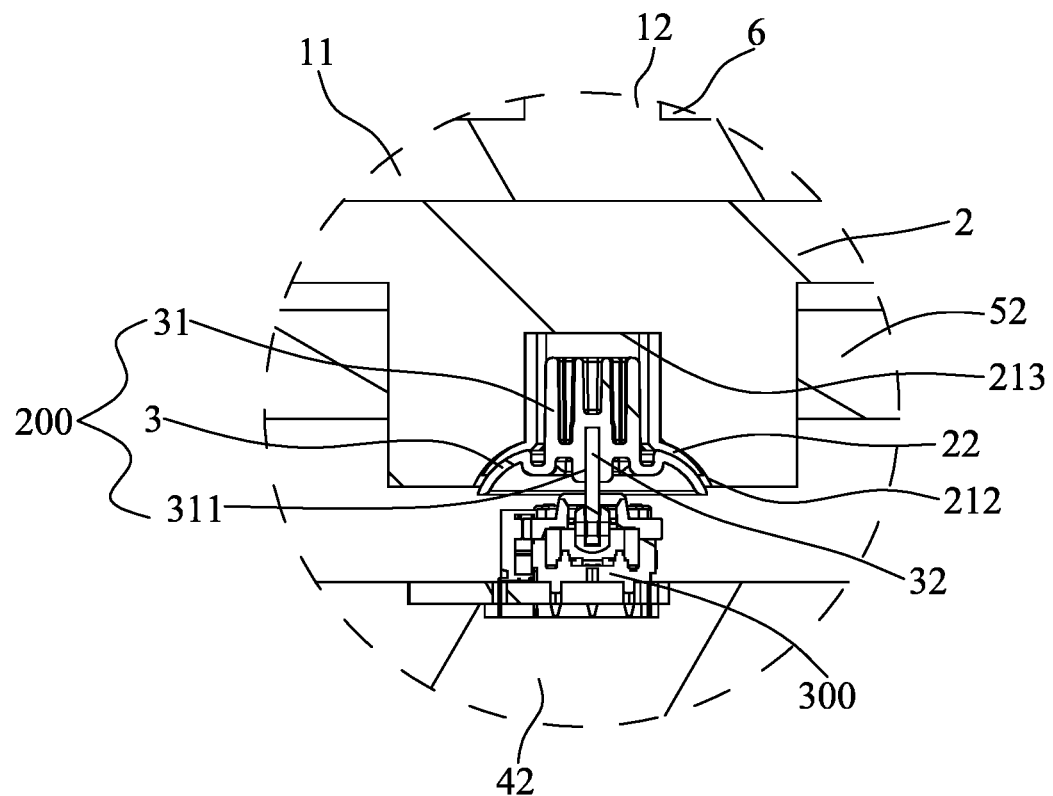
FIG. 8 is another enlarged view of the encircled portion VII of the pressing structure of FIG. 6.

With reference to FIG. 4, FIG. 7 and FIG. 8, the pressing structure 100 is used to mount the rocker component 200 on the electronic component 300. The rocker component 200 has a base portion 3. A middle of a top of the base portion 3 protrudes upward to form a rod part 31. The base portion 3 opens an assembling hole 311 penetrating downward through middles of a bottom of the rod part 31 and the base portion 3.

The electronic component 300 is equipped with a fixing rib 32. The fixing rib 32 is corresponding to the assembling hole 311.

With reference to FIG. 1 to FIG. 6, the pressing structure 100 is assembled in a pressing machine 400. The pressing machine 400 includes a processing station 4 and a presser 5. The presser 5 is mounted on the processing station 4.

The processing station 4 includes a table 41 and a sliding board 42. The sliding board 42 is mounted on the table 41. The sliding board 42 includes two slide rails 421, and a tray 422 slidably disposed on the two slide rails 421. The two slide rails 421 are arranged parallel to each other and spaced from each other, so that the tray 422 is longitudinally movable along the two slide rails 421, and correspondingly the tray 422 longitudinally moves back and forth.

The presser 5 is mounted on the table 41. The presser 5 includes a fixing board 51, an active board 52 disposed under and parallel with the fixing board 51, a plurality of sliding assemblies 53, a pneumatic cylinder 54 and at least two pressing structures 100. In the first preferred embodiment and the second preferred embodiment, the presser 5 includes two pressing structures 100.

The fixing board 51 opens a first upper fixing hole 511 vertically penetrating through the fixing board 51, and at least two second upper fixing holes 512 arranged adjacent to and spaced from two sides of the first upper fixing hole 511. The fixing board 51 further opens a plurality of third upper fixing holes 513. The first upper fixing hole 511 and the at least two second upper fixing holes 512 are disposed among the plurality of the third upper fixing holes 513. The active board 52 opens a first lower fixing hole 521 vertically penetrating through the active board 52 and corresponding to the first upper fixing hole 511, and at least two second lower fixing holes 522 vertically penetrating through the active board 52 and arranged adjacent to and spaced from two sides of the first lower fixing hole 521. The at least two second lower fixing holes 522 are corresponding to the at least two second upper fixing holes 512, respectively. In the first preferred embodiment and the second preferred embodiment, the presser 5 has two second upper fixing holes 512 and two second lower fixing holes 522 corresponding to the two pressing structures 100.

The active portion 52 further opens a plurality of third lower fixing holes 523 vertically penetrating through the active portion 52 and corresponding to the plurality of the third upper fixing holes 513, respectively. Each sliding assembly 53 includes a sliding block 531 and a sliding rod 532. The sliding block 531 is mounted around the sliding rod 532. A top portion of the sliding block 531 protrudes outward to form a limiting portion 5311. The sliding block 531 opens a sliding hole 533 penetrating through a top surface and a bottom surface of the sliding block 531. Each sliding block 531 passes through one third lower fixing hole 523, at the same moment, the limiting portion 5311 is blocked by and abuts against the active board 52. The limiting portion 5311 is fixed to the active board 52. Each sliding rod 532 passes through the sliding hole 533 and the third lower fixing hole 523 of one sliding block 531, respectively. A free end of each sliding rod 532 is fixed in one third lower fixing hole 523. Thus, each sliding block 531 is movable along one sliding rod 532 so as to drive the active board 52 together with the sliding block 531 to move up and down.

The pneumatic cylinder 54 is mounted on the fixing board 51. A middle of the pneumatic cylinder 54 is equipped with an active rod 541. The active rod 541 passes downward through the first upper fixing hole 511 and is fixed into the first lower fixing hole 521. Each pressing structure 100 passes through one second upper fixing hole 512. Each pressing block 211 passes through one second lower fixing hole 522, at the same time, the pedestal 21 approaches and is spaced from a top surface of the active board 52. The pressing structure 100 further has a counterweight 6. A middle of the counterweight 6 opens a through-hole 61 penetrating through a top surface and a bottom surface of the counterweight 6. When the pressing structure 100 is pressed downward, the counterweight 6 is mounted on the pole stander 12 to adjust a pressure exerted on the pressing structure 100. The pole stander 12 passes through the through-hole 61.

With reference to FIG. 1 to FIG. 8, when the rocker component 200 is combined with the electronic component 300, the pneumatic cylinder 54 pushes the active rod 541 to move downward so as to drive the active board 52 together with the sliding blocks 531 of the plurality of the sliding assemblies 53 to move downward, so that each pressing structure 100 moves downward simultaneously. At the same time, the first pressing face 212 moves downward and is in contact with the base portion 3 of the rocker component 200, and the second pressing face 213 moves downward and is in contact with the fixing rib 32. The fixing rib 32 passes through the receiving hole 223. After then, the pneumatic cylinder 54 continues pushing the active rod 541 to move downward, so that the first pressing face 212 and the second pressing face 213 push the base portion 3 and the fixing rib 32 to move downward, respectively. At the moment, the assembling hole 311 is combined with the fixing rib 32, so that the rocker component 200 is mounted downward to the electronic component 300.

When the pressing structure 100 pushes the rocker component 200 to move downward, because a pressing force of the pneumatic cylinder 54 which is an existing design is a fixed value, at the time of the rocker component 200 being pressed to the electronic component 300, a portion of the rocker component 200 that is in contact with the electronic component 300 is easy to cause a damage on the more delicate electronic component 300 due to a pressure given by the pneumatic cylinder 54. Therefore, the plurality of the cushion elements 22 mounted on the pedestal 21 of the pressing structure 100 absorb the excessive pressure force generated on the pressing element 2 during a pressing process of the rocker component 200 and the electronic component 300, so that the rocker component 200 and the electronic component 300 will be without deformations and damages due to an assembly between the rocker component 200 and the electronic component 300.

With reference to FIG. 1, FIG. 4 and FIG. 7, in the first preferred embodiment, the cushion element 22 is mounted between a bottom of the support frame 1 and the pressing element 2 for absorbing an excessive pressure force generated on the pressing element 2 at the time of the pressing element 2 being pressed downward. The cushion element 22 is a spring. Specifically, the plurality of the cushion elements 22 are mounted between the bottom of the support frame 1 and the pressing element 2. Each cushion element 22 is a spring. When the pressing structure 100 is pressed, the pressing structure 100 presses the rocker component 200 to move downward, and the cushion element 22 absorbs a pressing force generated from the pressing structure 100 to reduce the excessive pressure force exerted on the rocker component 200 by the pressing element 2, so that the pressing structure 100 is capable of absorbing the excessive pressure force which is caused by the pressing structure 100 exerted on a processed component which is the electronic component 300 during a pressure operation, specifically, the rocker component 200 is mounted on the electronic component 300 by the pressing structure 100, and the pressing element 2 is without exerting the excessive pressure force on the rocker component 200 to make the rocker component 200 overly press downward on the electronic component 300 for preventing the deformation and the damage of the electronic component 300.

With reference to FIG. 1 to FIG. 8, the pressing structure 100 in accordance with a second preferred embodiment of the present invention is shown. Differences between the pressing structure 100 in accordance with the first preferred embodiment and the pressing structure 100 in accordance with the second preferred embodiment are described as follows. The cushion element 22 is mounted on the first pressing face 212. Specifically, each cushion element 22 is mounted on the first pressing face 212 for absorbing the excessive pressure force generated on the pressing element 2 at the time of the pressing element 2 being pressed downward, so that the rocker component 200 is mounted on the electronic component 300 by the pressing structure 100, the rocker component 200 and the electronic component 300 are without affording the excessive pressure force. Each cushion element 22 is a strong and flexible plastic rib. Each cushion element 22 has an elastic portion 222, and an extending portion 221 extended upward from a top end of the elastic portion 222. The elastic portion 222 is gradually arched outward and is of an arc shape. The elastic portion 222 is matched with the first pressing face 212. The elastic portion 222 of each cushion element 22 is attached to the first pressing face 212. The extending portion 221 of each cushion element 22 projects into the receiving hole 223 and abuts against the second pressing face 213. The pressing structure 100 includes three cushion elements 22. When the pressing structure 100 proceeds with the pressure operation, the pressing structure 100 presses the rocker component 200 downward, and each cushion element 22 contacts the rocker component 200, Each cushion element 22 has an elasticity, each cushion element 22 absorbs the pressing force generated from the pressing structure 100 to reduce the excessive pressure force exerted on the rocker component 200 by the pressing element 2, so that the rocker component 200 is mounted on the electronic component 300 by the pressing structure 100, and the pressing element 2 is without exerting the excessive pressure force on the rocker component 200 to make the rocker component 200 overly press downward on the electronic component 300 for preventing the deformation and the damage of the electronic component 300.

As described above, each cushion element 22 is mounted on the pedestal 21 of the pressing structure 100, when the pressing structure 100 proceeds with the pressing operation, each cushion element 22 absorbs the pressing force generated from the pressing structure 100 to reduce the excessive pressure force exerted on the rocker component 200 by the pressing element 2, so that the rocker component 200 is mounted on the electronic component 300 by the pressing structure 100, and the pressing element 2 is without exerting the excessive pressure force on the rocker component 200 to make the rocker component 200 overly press downward on the electronic component 300 for preventing the deformation and the damage of the electronic component 300.

What is claimed is:

1. A pressing structure adapted for mounting a rocker component on an electronic component, comprising:
a support frame having a base plate; and
a pressing element mounted to a bottom surface of the base plate, the pressing element including a pedestal and a cushion element, the pedestal having a base board, a bottom surface of the base board protruding downward to form a pressing block, a bottom surface of the pressing block being recessed upward and gradually arched outward from top to bottom to form a first pressing face facing downward, the rocker component having a base portion, the first pressing face being in contact with the base portion, the cushion element being mounted on the pedestal for absorbing an excessive pressure force generated on the pressing element at the time of the pressing element being pressed downward, so that the rocker component is mounted on the electronic component by the pressing structure, the rocker component and the electronic component being without affording the excessive pressure force to cause a damage and a deformation of the electronic component.

2. The pressing structure as claimed in claim 1, wherein a middle of a top of the first pressing face is further recessed upward to form a second pressing face, the electronic component is equipped with a fixing rib, the second pressing face is in contact with the fixing rib.

3. The pressing structure as claimed in claim 1, wherein the cushion element is a spring.

4. The pressing structure as claimed in claim 3, wherein the pressing element includes a plurality of cushion elements, the plurality of the cushion elements are mounted between a bottom of the support frame and the pressing element.

5. The pressing structure as claimed in claim 1, wherein the cushion element is a strong and flexible plastic rib.

6. The pressing structure as claimed in claim 5, wherein the cushion element is mounted on the first pressing face.

7. The pressing structure as claimed in claim 1, further comprising a counterweight, the support frame further having a pole stander protruded upward from a middle of a top surface of the base plate, the counterweight being mounted on the pole stander to adjust a pressure when the pressing structure is pressed downward.

8. The pressing structure as claimed in claim 1, wherein several portions of the bottom surface of the base plate are recessed inward to form a plurality of first fixing holes, a periphery of the pedestal opens a plurality of the second fixing holes vertically penetrating through the periphery of the pedestal, and the plurality of the second fixing holes are corresponding to the plurality of the first fixing holes, respectively, the pressing structure further includes a plurality of fixing elements, the plurality of the fixing elements pass through the plurality of the second fixing holes and the plurality of the first fixing holes, respectively, so that the support frame and the pressing element are fastened with each other.

9. A pressing structure adapted for mounting a rocker component on an electronic component, comprising:
a support frame; and
a pressing element mounted under the support frame, the pressing element including a pedestal and a cushion element, the pedestal having a base board, a bottom surface of the base board protruding downward to form a pressing block, a bottom surface of the pressing block being recessed upward and gradually arched outward from top to bottom to form a first pressing face facing downward, the cushion element being mounted between a bottom of the support frame and the pressing element for absorbing an excessive pressure force generated on the pressing element at the time of the pressing element being pressed downward, so that the rocker component is mounted on the electronic component by the pressing structure, the rocker component and the electronic component being without affording the excessive pressure force,
wherein the rocker component has a base portion, the first pressing face is in contact with the base portion of the rocker component.

10. The pressing structure as claimed in claim 9, wherein the cushion element is a spring.

11. The pressing structure as claimed in claim 9, wherein a middle of a top of the first pressing face is further recessed upward to form a second pressing face, the electronic component is equipped with a fixing rib, the second pressing face is in contact with the fixing rib.

12. A pressing structure adapted for mounting a rocker component on an electronic component, comprising:
a support frame; and
a pressing element mounted under the support frame, the pressing element including a pedestal and a plurality of cushion elements, the pedestal having a base board, a bottom surface of the base board protruding downward to form a pressing block, a bottom surface of the pressing block being recessed upward and gradually arched outward from top to bottom to form a first pressing face facing downward, each cushion element being mounted on the first pressing face for absorbing an excessive pressure force generated on the pressing element at the time of the pressing element being pressed downward, so that the rocker component is mounted on the electronic component by the pressing structure, the rocker component and the electronic component being without affording the excessive pressure force, each cushion element contacting the rocker component.

13. The pressing structure as claimed in claim 12, wherein each cushion element is a strong and flexible plastic rib.

14. The pressing structure as claimed in claim 12, wherein a middle of a top of the first pressing face is further recessed upward to form a second pressing face, the middle of the top of the first pressing face forms a receiving hole communicated between the first pressing face and the second pressing face, each cushion element has an elastic portion, and an extending portion extended upward from a top end of the elastic portion, the elastic portion is attached to the first pressing face, the extending portion projects into the receiving hole and abuts against the second pressing face.

15. The pressing structure as claimed in claim 14, wherein the elastic portion is gradually arched outward and is of an arc shape, the elastic portion is matched with the first pressing face.

16. The pressing structure as claimed in claim 14, wherein the electronic component is equipped with a fixing rib, the second pressing face is in contact with the fixing rib.

* * * * *